United States Patent
Hiraoka

(10) Patent No.: US 7,693,177 B2
(45) Date of Patent: Apr. 6, 2010

(54) NAVIGATIONAL AID AND CARRIER SENSE TECHNIQUE

(75) Inventor: Yasushi Hiraoka, Nishinomiya (JP)

(73) Assignee: Furuno Electric Company, Ltd., Nishinomiya (JP)

(*) Notice: Subject to any disclaimer, the term of this patent is extended or adjusted under 35 U.S.C. 154(b) by 522 days.

(21) Appl. No.: 11/706,468

(22) Filed: Feb. 14, 2007

(65) Prior Publication Data
US 2007/0194979 A1    Aug. 23, 2007

(30) Foreign Application Priority Data
Feb. 14, 2006  (JP)  ............... 2006-035960

(51) Int. Cl.
*H04L 12/43* (2006.01)
(52) U.S. Cl. ............ 370/459; 370/324; 370/348; 370/350; 370/447
(58) Field of Classification Search .......... 370/321, 370/322, 324, 336, 347, 348, 350, 442–445, 370/447–448, 458, 459, 461
See application file for complete search history.

(56) References Cited

U.S. PATENT DOCUMENTS

| 7,522,556 | B2* | 4/2009 | Hanna et al. .......... 370/329 |
| 2004/0146043 | A1* | 7/2004 | Hiraoka et al. ....... 370/350 |
| 2004/0174895 | A1 | 9/2004 | Hiraoka et al. |
| 2008/0130622 | A1* | 6/2008 | Hiertz et al. ......... 370/348 |

FOREIGN PATENT DOCUMENTS

| EP | 0094180 A2 | 11/1983 |
| GB | 2261787 A | 5/1993 |
| JP | 2002374199 | 12/2002 |
| KR | 200407159 A | 1/2004 |

(Continued)

OTHER PUBLICATIONS

Lewandowski, M.J. et al., "Automatic Identification System A general discussion of development, application and implementation," pub. Oct. 27, 2004 at http://www.rdc.uscg.gov/iws/pubs/ais-paper.pdf, p. 1-14.

(Continued)

*Primary Examiner*—Ricky Ngo
*Assistant Examiner*—Pao Sinkantarakorn
(74) *Attorney, Agent, or Firm*—Nutter McClennen & Fish LLP; John J. Penny, Jr.

(57) ABSTRACT

A navigational aid for use as an AIS apparatus includes a memory for storing information about previous use of individual time slots synchronized with transmission schedules of other stations and a signal detector for judging whether an information signal exists in a time slot specified in accordance with a synchronization timing signal based on the information stored in the memory and a result of monitoring of the behavior of a baseband signal obtained from a received signal on an IQ-plane. The navigational aid transmits information about own station based on a result of judgment by the signal detector. The monitoring of the behavior of the received baseband signal plotted on the IQ-plane can be accomplished by performing pattern recognition operation, for which a carrier sense technique, such as a support vector machine, subspace method or neural network, can be used.

15 Claims, 13 Drawing Sheets

FOREIGN PATENT DOCUMENTS

WO    WO-WO 93/01576    1/1993

OTHER PUBLICATIONS

Proc. Third Australian Conference on Neural Networks (ACNN '92), Canberra, Feb. 3-5, 1992, pub. Sydney Univ, pp. 182-185, Hefferan J.T. et al., "The influence of output bit mapping on convergence time in M-ary PSK neural network detectors."

Proc. 1992 IEEE Internat. Conf. on Acoustics, Speech and Signal Processing, San Francisco, Mar. 23-26, 1992, pub. IEEE, US, vol. 5, pp. 413-416, Cabrera, M. et al., "Eigen based methods to jointly estimate frequency and timing in PSK and MSK signals," ISBN 0-7803-0532-9 see e.g. Section 3.

United Kingdom Search Report for the corresponding international application No. GB0702370.8 dated Jun. 26, 2007.

* cited by examiner

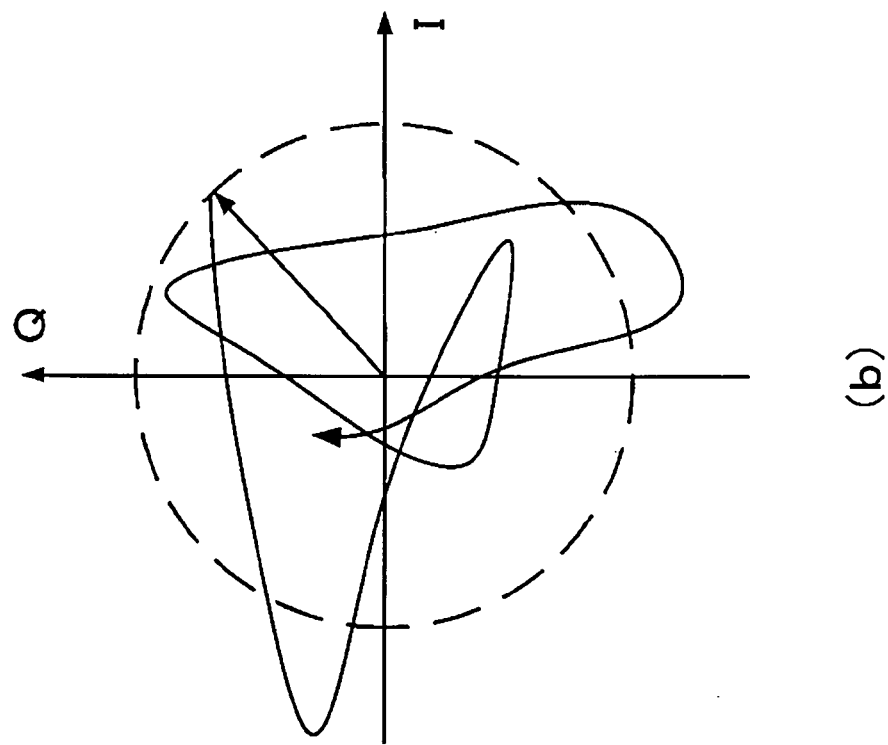
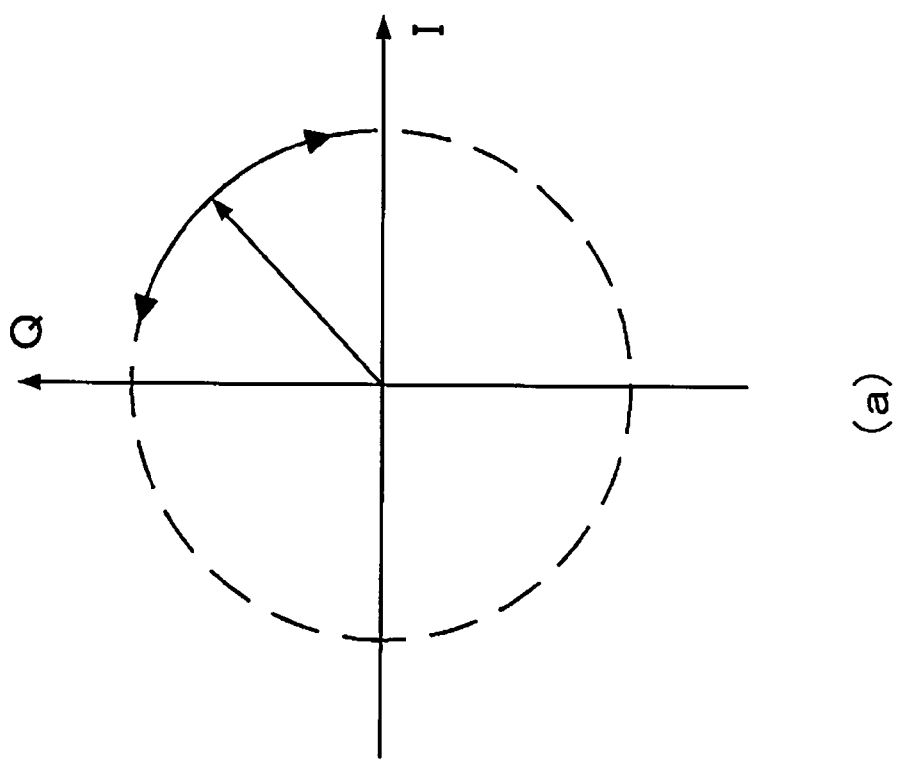
FIG 8

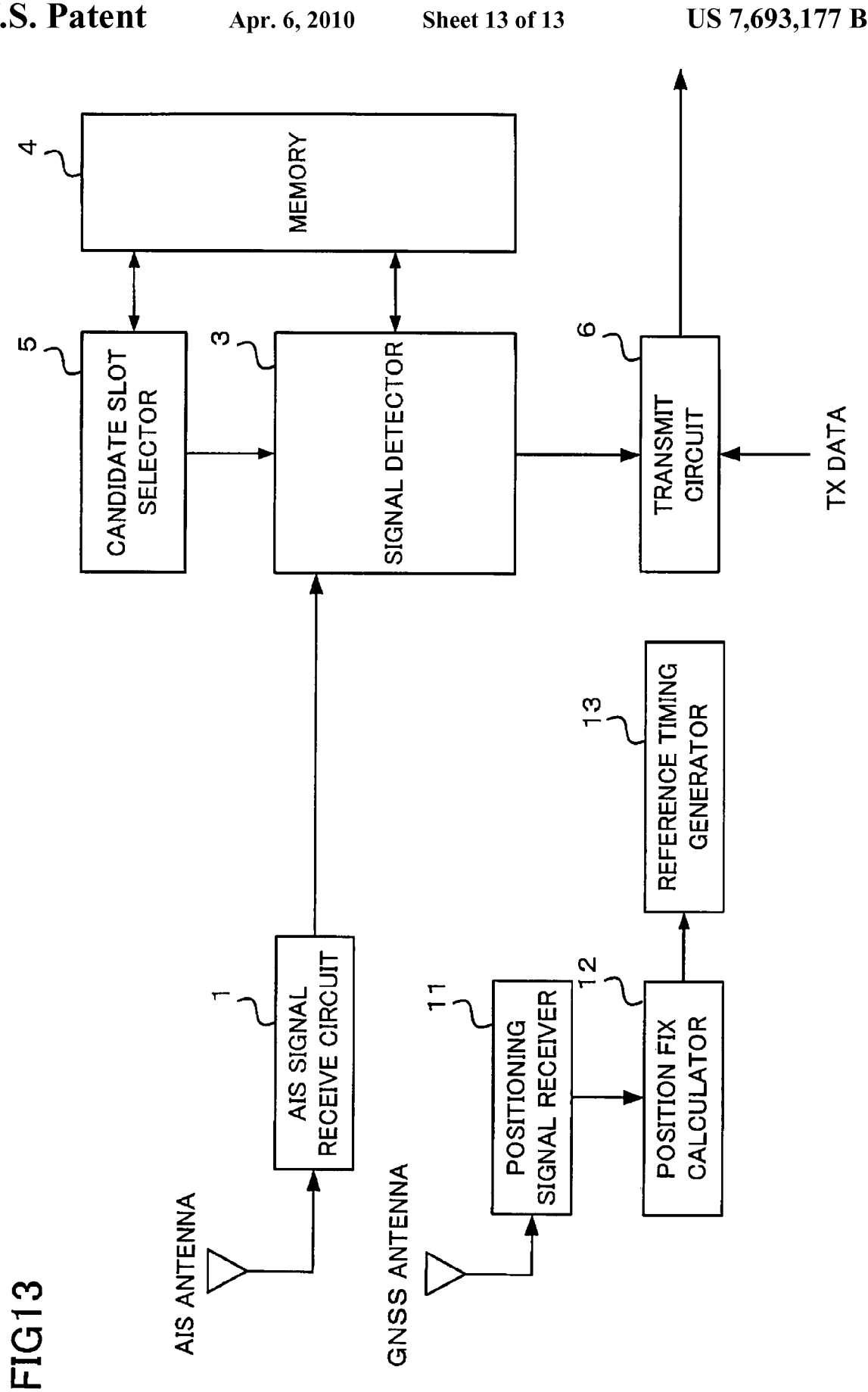

NAVIGATIONAL AID AND CARRIER SENSE TECHNIQUE

BACKGROUND OF THE INVENTION

1. Field of the Invention

The present invention relates generally to a carrier sense technique and system and, more particularly, to communications technology used in the Class B Carrier Sense Automatic Identification System (AIS), for instance.

2. Description of the Related Art

Beginning in 2002, the Safety of Life at Sea (SOLAS) regulations have required ships of specified classes (hereinafter referred to as SOLAS ships) to be equipped with the Automatic Identification System (AIS) as a tool for streamlining vessel traffic services (VTS) and promoting collision avoidance, for instance.

An AIS unit compulsorily installed on a SOLAS ship broadcasts messages containing such information as the name of ship, position, navigation status and ship movement, dimensions (length and beam) of ship, type of ship, type of cargo, draft and destination and receives the same kinds of information from other AIS-equipped ships near own ship, so that each SOLAS ship can acquire information on other ships in a particular area. The use of the AIS system enables own ship to verify not only the presence of nearby ships but also such information as the name of ship, dimensions (length and beam), type of ship, type of cargo, draft and destinations of each nearby ship which have been impossible or difficult to obtain by radar observation.

The AIS system provides a communications network using phase-modulated signals for which two very high frequency (VHF) channels are assigned. The AIS network employs predefined communications techniques to avoid conflicts (collisions) of radio transmissions. These techniques include so-called "Class A AIS" which is currently used for SOLAS ships and "Class B AIS" which will be implemented in equipment installed on non-SOLAS ships on a non-mandatory basis.

Class A AIS uses Self-Organized Time Division Multiple Access (SOTDMA) technology in which each one-minute period referred to as a "frame" is divided into 2250 time slots each of which is 26.7 ms long. A Class A AIS unit uses each of these time slots as a unit of transmission of the aforementioned information.

One characteristic feature of Class A is that each Class A AIS unit simultaneously transmits own ship information and slot reservation information as mentioned in Japanese Patent Application Publication No. 1995-501879. For the sake of explanation, it is now assumed that there are three AIS-participating ships, designated Ship A, Ship B and Ship C, and a Ship A station, for instance, transmits own ship information together with slot reservation information specifying a slot in a next frame to be reserved for its own use. In this situation, a Ship B station transmits its own ship information together with slot reservation information specifying a slot in the next frame to be reserved while avoiding a slot allocation conflict with the Ship A station. A Ship C station then transmits its own ship information and slot reservation information while avoiding slot allocation conflicts with the Ship A and Ship B stations. The AIS-participating ships repetitively carry out such a sequence from one frame to the next while communicating respective transmission schedules with due attention to avoid multi-user scheduling conflicts.

For successful SOTDMA communication of this kind, it is essential that all participating stations be precisely synchronized using a common time slot scheduling scheme. AIS equipment described in the aforementioned Publication has a built-in Global Navigation Satellite System (GNSS) receiver, such as a Global Positioning System (GPS) receiver, which provides an accurate one pulse-per-second (1 PPS) signal obtained from a received satellite signal. All AIS stations are precisely synchronized by using this 1 PPS signal.

On the other hand, Class B AIS equipment is a low-cost AIS unit designed for installation on a non-SOLAS ship. As Class B AIS units normally use Carrier Sense Time Division Multiple Access (CSTDMA), Class B AIS is hereinafter referred to as Class B (CS) AIS, "CS" representing Carrier Sense technology.

To avoid any conflicts with transmission schedules of Class A AIS stations installed on SOLAS ships, each Class B (CS) AIS station monitors transmissions from Class A stations to see if there is other traffic before initiating a message transmission. The Class B (CS) station transmits own message in a specific time slot only after verifying the absence of other radio traffic (i.e., signals carrying information transmitted from any Class A stations).

To be more specific, the Class B (CS) station performs the following procedure when transmitting a message:

(1) Find a Class A station synchronized with GPS time by receiving signals from other AIS stations in an asynchronous fashion;

(2) Determine timing kept by a time base of the GPS-synchronized Class A station from bit timing of that station;

(3) Using the timing of the Class A station time base, choose 10 future time slots (hereinafter referred to as "candidate slots") in which the Class B (CS) station may carry out "carrier sense" operation to detect a carrier of an AIS information signal;

(4) Sense (or "listen to") a carrier of any AIS signal for approximately 2 ms at the start of a candidate slot in which own station wants to transmit;

(5) If the candidate slot is judged to be free with no information signals from other AIS stations detected therein as a result of the carrier sense operation, immediately transmit own message in the pertinent slot; and (6) If the candidate slot is judged to be occupied with an information signal from another AIS station detected therein as a result of the carrier sense operation, abandon the pertinent slot, wait and retry transmission in a next candidate slot.

Class B (CS) AIS allows a short duration of time of approximately 2 ms at the start of a slot for performing the carrier sense operation, so that each Class B (CS) station must judge whether there exists a signal transmitted from a Class A station during approximately the 2 ms time duration. It is however extremely difficult for a Class B (CS) station to achieve such a high receiver gain that is high enough to permit a reliable judgment on the presence or absence of an AIS signal within such a short time duration (approximately 2 ms), compared to a case where the Class B (CS) station is allowed a time duration of approximately 26.7 ms to receive a complete time slot and make a judgment based thereupon. Although it would be possible to increase the receiver gain using a narrow-band filter design, a group delay caused by the narrow-band filter design results in a reduction in the number of bits that can be processed within a given period of time.

In addition, a typical method of the carrier sense operation based on measurement of the intensity of a received radio signal can cause a misjudgment in carrier sensing in the presence of high-level background noise or erratic noise and, therefore, the 2 ms time duration is too short to make a reliable judgment on the presence or absence of an AIS signal.

SUMMARY OF THE INVENTION

In view of the foregoing, it is a general object of the invention to provide a carrier sense technique which makes it possible to carry out carrier sense operation in a reliable and accurate fashion. It is a more specific object of the invention to provide a navigational aid and a carrier sense technique used therein which allow a reduction in time required for performing the carrier sense operation and helps avoid conflicts of radio transmissions from Class A AIS and Class B (CS) stations.

According to a principal form of the invention, a navigational aid includes a receiver for receiving signals transmitted from other stations, a reference timing generator for generating a synchronization timing signal used for controlling timing of communication with the other stations, a memory for storing information about previous use of each time slot specified in accordance with the synchronization timing signal, a signal detector for judging whether an information signal exists in a time slot specified in accordance with the synchronization timing signal by comparing a measurement value of signal intensity of the signal received by the receiver and a threshold determined based on the information stored in the memory, and a transmitter for transmitting information about own station in a time slot which has been judged by the signal detector within a specific time duration at the start of the time slot to be free of an information signal transmitted from any of the other stations.

According to another principal form of the invention, a navigational aid includes a receiver for receiving signals transmitted from other stations, a reference timing generator for generating a synchronization timing signal used for controlling timing of communication with the other stations, a memory for storing information about previous use of each time slot specified in accordance with the synchronization timing signal, a signal detector for performing pattern recognition operation to determine whether a baseband signal obtained by demodulating the signal output from the receiver is an information signal and then judging whether an information signal exists in a time slot specified in accordance with the synchronization timing signal by using a result of the pattern recognition operation and the information stored in the memory, and a transmitter for transmitting information about own station in a time slot which has been judged by the signal detector within a specific time duration at the start of the time slot to be free of an information signal transmitted from any of the other stations. In this navigational aid, the signal detector may perform the pattern recognition operation by using a support vector machine, subspace method or neural network, or a combination thereof.

According to the invention, the navigational aid (Class B AIS apparatus) includes the memory for storing the information about previous use of the time slot specified in accordance with the synchronization timing signal and the signal detector which is so configured as to judge whether an information signal exists in the time slot by comparing the signal intensity of the signal received by the receiver and the threshold determined based on the information about the previous use of the time slot as mentioned above. The navigational aid thus structured can monitor transmissions from Class A AIS stations by using a carrier sense technique with increased accuracy and thereby transmit the information about own station with proper timing while avoiding potential collisions with transmissions from Class A AIS stations.

In one feature of the invention, the navigational aid further includes a candidate slot selector for selecting candidate slots based on the information stored in the memory, the candidate slots being a set of time slots from which the time slot used for transmitting the information about own station is selected.

The candidate slot selector selects candidate slots for transmitting the information about own station based on the information about the previous use of each time slot, so that the navigational aid including the candidate slot selector can transmit the information about own station with proper timing while avoiding collisions with transmissions from Class A AIS stations.

In another feature of the invention, the signal detector verifies whether an information signal exists in the time slot specified in accordance with the synchronization timing signal throughout the entire time slot when the transmitter does not transmit the information about own station in the pertinent time slot, and the memory stores information about a result of verification by the signal detector as the information about previous use of the time slot.

In another feature of the invention, the navigational aid further includes a positioning signal receiver for receiving a positioning signal transmitted from a satellite, and a position fix calculator for performing position fixing operation using the positioning signal and acquiring a precise time signal, wherein the reference timing generator generates the synchronization timing signal based on the time signal obtained from the position fix calculator.

According to another principal form of the invention, a carrier sense system includes a signal receiver for receiving a signal, and a signal detector for performing pattern recognition operation to determine whether a baseband signal obtained by demodulating the signal output from the signal receiver is an information signal and then judging whether the signal received by the signal detector is the information signal based on a result of the pattern recognition operation. In one feature of the invention, the signal detector may perform the pattern recognition operation by using a support vector machine, subspace method or neural network, or a combination thereof.

According to the invention, the carrier sense system employed in the navigational aid (Class B AIS apparatus) judges whether an information signal exists in the specified time slot by performing the pattern recognition operation to determine whether a baseband signal obtained by demodulating the signal output from the signal receiver is an information signal by using a carrier sense technique, such as the support vector machine, subspace method and neural network. This makes it possible to perform the carrier sense operation and judge on the presence of a modulated signal by the pattern recognition operation, and not by simply evaluating the received signal intensity level.

The foregoing and other objects, features, aspects and advantages of the present invention will become more apparent from the following detailed description when read in conjunction with the accompanying drawings.

BRIEF DESCRIPTION OF THE DRAWINGS

FIGS. 8A and 8B are diagrams showing behavior of a TDMA-modulated signal and noise, respectively;

FIG. 13 is a block diagram showing an alternative configuration of a navigational aid according to the invention.

DETAILED DESCRIPTION OF THE PREFERRED EMBODIMENTS OF THE INVENTION

Specific embodiments of the invention are now described with reference to the accompanying drawings, wherein a navigational aid to which the invention is applied is an AIS apparatus designed for use as a Class B (CS) AIS system. The following discussion will center on a carrier sense technique which constitutes a main feature of the invention used in sensing the presence of radio signals transmitted from other AIS stations. This means that the discussion will not deal with ordinary operations carried out in the AIS system.

First Embodiment

Figure 1:
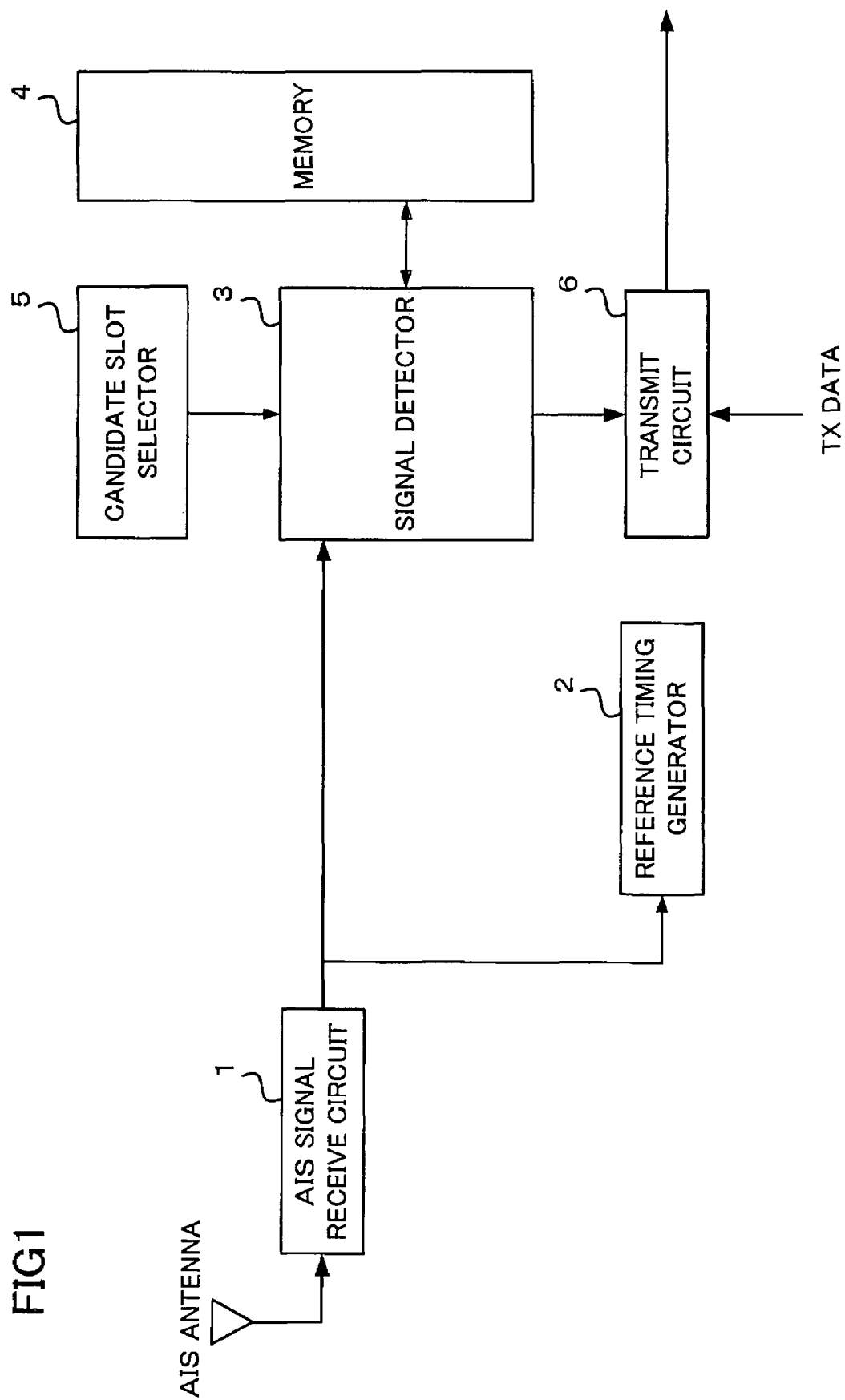
FIG. 1 is a block diagram showing a configuration of a navigational aid according to a first embodiment of the invention.

FIG. 1 is a block diagram showing a configuration of a navigational aid according to a first embodiment of the invention. As shown in FIG. 1, the navigational aid (Class B AIS apparatus) includes an AIS signal receive circuit 1, a reference timing generator 2, a signal detector 3, a memory 4, a candidate slot selector 5 and a transmit circuit 6.

Connected to an AIS antenna, the AIS signal receive circuit 1 receives an AIS signal transmitted in a specified frequency band from a mobile station, such as a station installed on another ship (target ship) or a buoy, or a land-based fixed station and delivers the received signal to the reference timing generator 2 and the signal detector 3.

The reference timing generator 2 generates a synchronization timing signal used for controlling timing of communication with other AIS stations. Specifically, the reference timing generator 2 finds out a Class A station synchronized with GPS time using signals received from other AIS stations in an asynchronous fashion and delivered from the AIS signal receive circuit 1, determines timing kept by a time base of the GPS-synchronized Class A station from bit timing thereof, and generates the synchronization timing signal synchronized with the time base of the Class A station. Using the synchronization timing signal thus generated, the reference timing generator 2 synchronizes its own time base with the time base of the GPS-synchronized Class A station so that the AIS apparatus installed on own ship can communicate with other AIS stations installed on target ships using precisely synchronized time slots. This arrangement makes it possible to communicate with not only an AIS station fitted with a GPS receiver but also AIS stations on non-GPS-equipped ships.

The signal detector 3 judges whether an information signal transmitted from another AIS station is present in a time slot specified in accordance with the synchronization timing signal based on the AIS signal received by the AIS signal receive circuit 1 and information about previous use of the time slot stored in the memory 4.

Figure 2:
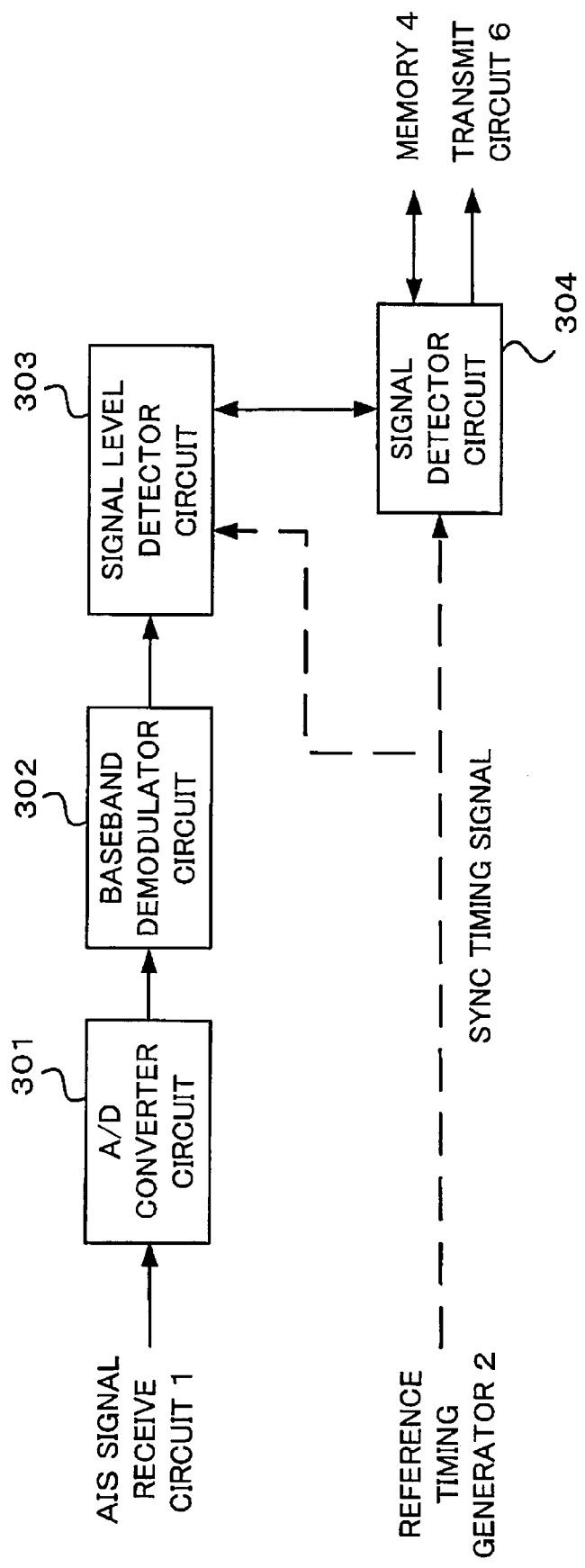
FIG. 2 is a block diagram showing a configuration of a signal detector of the navigational aid of the first embodiment.

FIG. 2 is a block diagram showing a detailed configuration of the signal detector 3 of the AIS apparatus according to the first embodiment of the invention.

Referring to FIG. 2, the signal detector 3 includes an analog-to-digital (A/D) converter circuit 301, a baseband demodulator circuit 302, a signal level detector circuit 303 and a signal detector circuit 304.

The A/D converter circuit 301 converts the AIS signal received by the AIS signal receive circuit 1 into digital data and the baseband demodulator circuit 302 generates a baseband signal by synchronous demodulation of an output of the A/D converter circuit 301. The signal level detector circuit 303 determines signal intensity of the received signal from the baseband signal generated by the baseband demodulator circuit 302. Then, the signal detector circuit 304 judges whether an information signal exists in the specified time slot by comparing the detected signal intensity and a specific threshold value. At this point, the signal detector circuit 304 updates the threshold value for judging the signal intensity level according to previous use of the time slot stored in the memory 4.

A rule controlling transmissions in Class A AIS contains a concept known as "time-out," which requires that an AIS station must continue to use the same slot until a slot time-out occurs in principle. Typically, the slot time-out is set to an initial value of 4 to 8 minutes. Since 1 frame is 1 minute long, a Class A AIS station continues to transmit an information signal in the same slot over approximately 6 successive frames on average. This means that the Class A AIS station governed by this transmission rule normally has a high probability of continually using the same slot over successive frames.

Accordingly, the signal detector circuit 304 predicts whether the individual time slots in a next frame would be free or occupied based on information about previous judgments on the presence or absence of an information signal in the time slot stored in the memory 4 and updates the threshold value with which the detected signal intensity level is compared.

The memory 4 is a storage device for storing the information about previous use of time slots of each frame. The AIS apparatus stores the information used in judging the presence or absence of an information signal in this memory 4 to allow the signal detector 3 to make the judgment. The information about the previous use of time slots may be stored in any appropriate form in the memory 4. For example, the information may be data indicating the presence or absence of an information signal in each time slot, numerical values representing the probability of the presence of an information signal in each time slot, or the signal intensity level detected in each time slot. The information stored in the memory 4 is used as reference values in a process of predicting whether the time slots in succeeding frames would be free or not.

Figure 3:
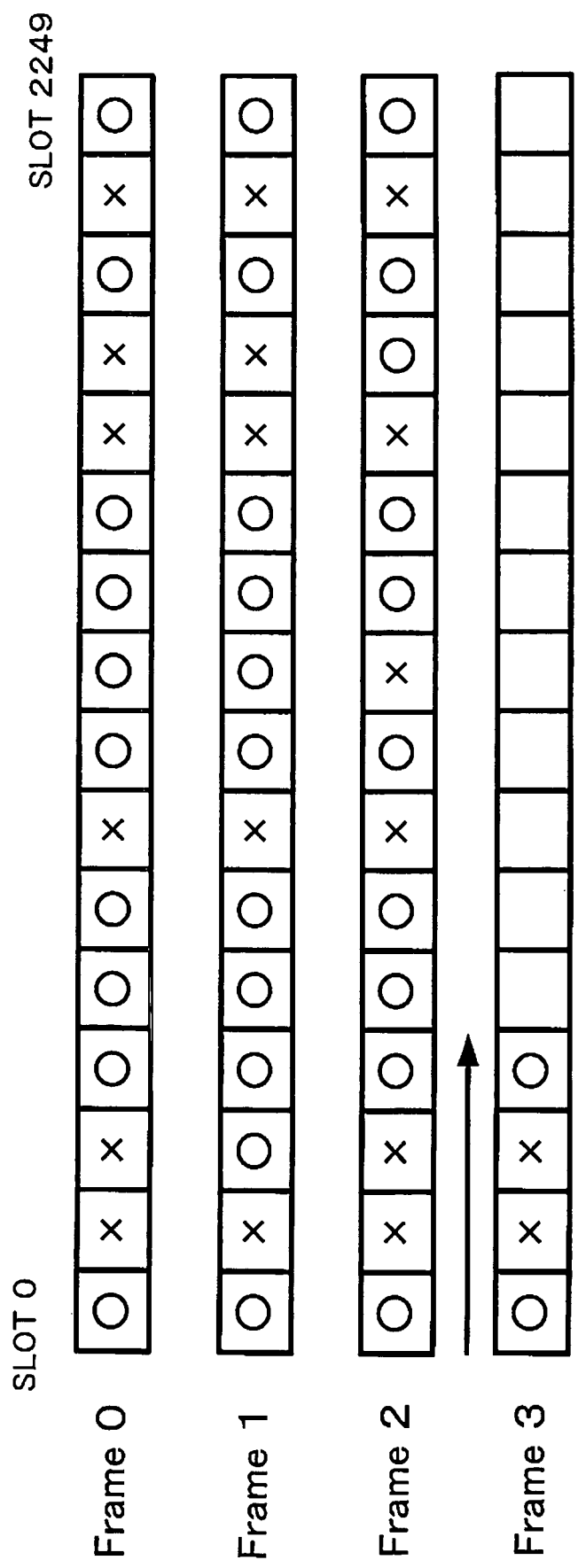
FIG. 3 is a diagram showing an example of information about previous use of time slots stored in a memory of the navigational aid of the first embodiment.

FIG. 3 is a diagram showing an example of the information stored in the memory 4. The example of FIG. 3 is for a case where the stored information simply indicates whether an information signal was present or absent in each of previous time slots, in which frame 3 is a current frame and frames 0 to 2 are previous frames. In the example of FIG. 3, shown in frame 0 are oldest pieces of the information stored in the memory 4. As the information on the use of new time slots is successively stored, the individual pieces of the previously stored information are deleted one by one on a first-in, first-out basis. The individual time slots are represented by small squares arranged in rows with a symbol "○" or "X" filled in each square, the symbol "○" indicating a time slot in which the information signal was present and the symbol "X" indicating a time slot in which the information signal was absent. The memory 4 stores the information about previous judgments on the presence or absence of an information signal in individual time slots in the aforementioned fashion.

The candidate slot selector 5 nominates 10 time slots. These 10 time slots are referred to as "candidate slots" from which the AIS apparatus will potentially select one for actual transmission. A rule applied to Class B (CS) AIS includes a requirement aimed at minimizing communication conflicts among Class B (CS) stations. This requirement is such that a Class B (CS) AIS station should first select 10 candidate slots from a plurality of time slots contained in a selection interval SI and then transmit an information signal in one time slot. The selection interval SI represents a "transmission enable time" which is determined in accordance with a predefined reporting rate.

The transmit circuit 6 performs preparatory operation for transmission of an information signal depending on the result of judgment on the presence or absence of an information signal (carrier sense operation) in a specific time duration (approximately 2 ms) at the start of one time slot. Then, on condition that there is no information signal being transmitted in the chosen time slot as a result of the carrier sense operation performed for approximately the 2 ms time duration, the transmit circuit 6 transmits own information signal immediately after the 2 ms carrier sense operation. On the other hand, if the transmit circuit 6 judges that the candidate slot chosen for transmission is occupied by an information signal transmitted from another AIS station, the signal detector 3 abandons this time slot and the AIS apparatus continues carrier sense in the next candidate slot.

The working of the navigational aid (Class B AIS apparatus) of the first embodiment is now described below.

(1) Operation for Generating Synchronization Timing Signal

The Class B (CS) AIS station finds out another AIS station which is synchronized with the GPS time to synchronize the time base of own station with the time base of the GPS-synchronized AIS station (Class A AIS station). This is achieved by receiving transmissions from other AIS stations in an asynchronous fashion and determining which transmission is synchronized with the GPS time. Specifically, the reference timing generator 2 determines timing kept by the time base of the GPS-synchronized Class A AIS station from bit timing of the transmission therefrom. Then, the reference timing generator 2 generates the synchronization timing signal synchronized with the time base of the Class A station.

The synchronization timing signal thus generated is a signal used for controlling transmission timing of own station and operation timings of all internal circuit components of the Class B AIS apparatus. The reference timing generator 2 continually generates and calibrates (corrects) the synchronization timing signal in the above-described manner regardless of whether the apparatus is switched on or off.

(2) Operation for Information Signal Transmission

In Class B (CS) AIS, the AIS apparatus is designed to nominate 10 candidate slots which may be used for transmission as discussed earlier according to the requirement of the applicable rule. In this embodiment, the candidate slot selector 5 specifies 10 future time slots as candidates of a time slot used for actual transmission of an information signal from own station.

The signal detector 3 listens for a carrier of an AIS signal for approximately 2 ms from the beginning of one of the candidate slots selected by the candidate slot selector 5. If the signal detector 3 judges as a result of the carrier sense operation that there is no information signal currently transmitted from other AIS stations in a particular candidate slot, the transmit circuit 6 transmits the information signal of own station immediately after the judgment by the signal detector 3. If, on the other hand, the signal detector 3 judges that the candidate slot is already occupied by an information signal transmitted from another AIS station, the signal detector 3 abandons the current candidate slot and, then, waits until the next candidate slot is reached and retries carrier sensing therein.

Figure 4:
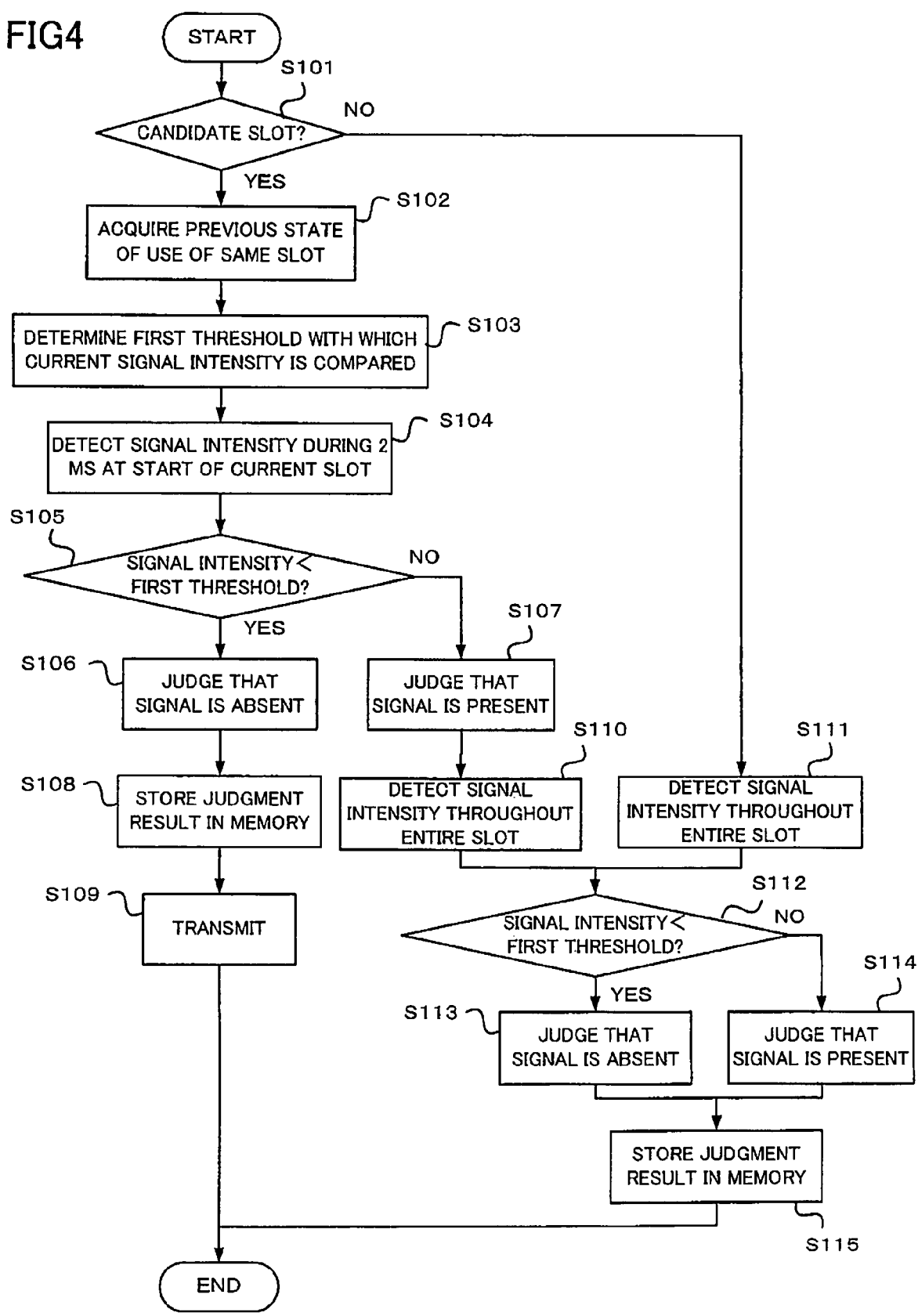
FIG. 4 is a flowchart showing a procedure of carrier sense operation performed by a signal detector of the navigational aid of the first embodiment.

Now, the carrier sense operation is explained in greater detail with reference to FIG. 4 which is a flowchart showing a procedure of the carrier sense operation performed by the signal detector 3 of the AIS apparatus. The following discussion deals with a case in which the signal detector 3 writes information on the presence or absence of information signals in the past time slots in the memory 4.

First, the signal detector 3 judges whether a current time slot is one of the candidate slots (step S101). If the current time slot is a candidate slot, the signal detector 3 proceeds to step S102, and if the current time slot is not a candidate slot, the signal detector 3 proceeds to step S111.

In a case where the current time slot is a candidate slot (Yes in step S101), the signal detector 3 acquires a state of previous use of the same time slot from the memory 4 (step S102). Then, based on the acquired state of previous use of the current time slot, the signal detector 3 determines a first threshold with which signal intensity detected during the 2 ms time duration at the start of the current time slot is compared (step S103). The signal detector 3 sets the first threshold in such a manner that the higher the probability of presence of an AIS signal in the time slot, the lower the first threshold taking into consideration the state of previous use of the pertinent time slot.

Next, the signal level detector circuit 303 detects the signal intensity during the 2 ms time duration at the start of the current time slot (step S104) and the signal detector circuit 304 compares the detected signal intensity with the first threshold determined in step S103 (step S105). If the signal intensity is lower than the first threshold as a result of comparison in step S105, the signal detector 3 judges that there is no information signal transmitted from any Class A station in the current time slot (step S106) and proceeds to step S108. If the signal intensity is equal to or higher than the first threshold, on the other hand, the signal detector 3 judges that there exists an information signal transmitted from a Class A station in the current time slot (step S107) and proceeds to step S110.

In a case where the current time slot is judged free with no information signal from a Class A station detected during 2 ms at the start of the current time slot as a result of the carrier sense operation, the signal detector 3 delivers this judgment result to the memory 4 for storage therein (step S108) and, then, the transmit circuit 6 transmits own information signal immediately after the 2 ms carrier sense operation (step S109).

In a case where the current time slot is judged occupied by an information signal transmitted from a Class A station as a result of the carrier sense operation performed during 2 ms at the start of the current time slot, on the other hand, the signal level detector circuit 303 continues to detect the signal intensity during a remaining 24.7 ms period of the current slot to acquire signal intensity data throughout the entirety of the current time slot (approximately 26.7 ms) (step S110).

Although the AIS apparatus may simply store the judgment result of the carrier sense operation performed during 2 ms at the start of the current time slot only, the result of the carrier sense operation performed throughout the entire time slot would permit a more accurate judgment. Thus, the AIS apparatus of the present embodiment employs an arrangement which stores the signal intensity data acquired throughout the entire time slot so that the signal detector 3 can make a judgment on the presence or absence of an AIS signal based on more precise information about the previous use of the time slot.

Even when the current time slot is not a candidate slot (No in step S101), the signal level detector circuit 303 detects signal intensities throughout the entire time slot and signal intensity data thus obtained representing the state of previous use of the current time slot is stored in the memory 4.

In this case, the signal detector circuit 304 compares the signal intensity detected throughout the entire time slot with a second threshold (step S112). The second threshold may be either a value determined based on the state of previous use of the time slot like the first threshold or a predetermined fixed value. If the signal intensity is lower than the second threshold as a result of comparison in step S112, the signal detector 3 judges that there is no information signal transmitted from any Class A station in the current time slot (step S113) and delivers this judgment result to the memory 4 for storage therein (step S115). If the signal intensity is equal to or higher than the second threshold, on the other hand, the signal detector 3 judges that there exists an information signal transmitted from a Class A station in the current time slot (step S114) and delivers this judgment result to the memory 4 for storage therein (step S115).

In the AIS apparatus of the present embodiment, information on the presence or absence of information signals in all the past time slots is stored in the memory 4 in steps S108 and S115 described above.

As thus far described, the navigational aid (Class B AIS apparatus) of the first embodiment is configured such that the memory 4 stores information about the previous use of the individual time slots and the signal detector 3 judges whether an information signal exists in the specified time slot by comparing the signal intensity detected from the signal received by the AIS signal receive circuit 1 with the threshold determined based on the state of previous use of the current time slot. The above-described carrier sense operation performed by the configuration of this embodiment makes it possible to monitor transmissions from Class A stations at once with higher accuracy so that the Class B (CS) station can transmit own information signal with proper timing while avoiding conflicts with transmissions from the Class A stations.

Second Embodiment

Figure 5:
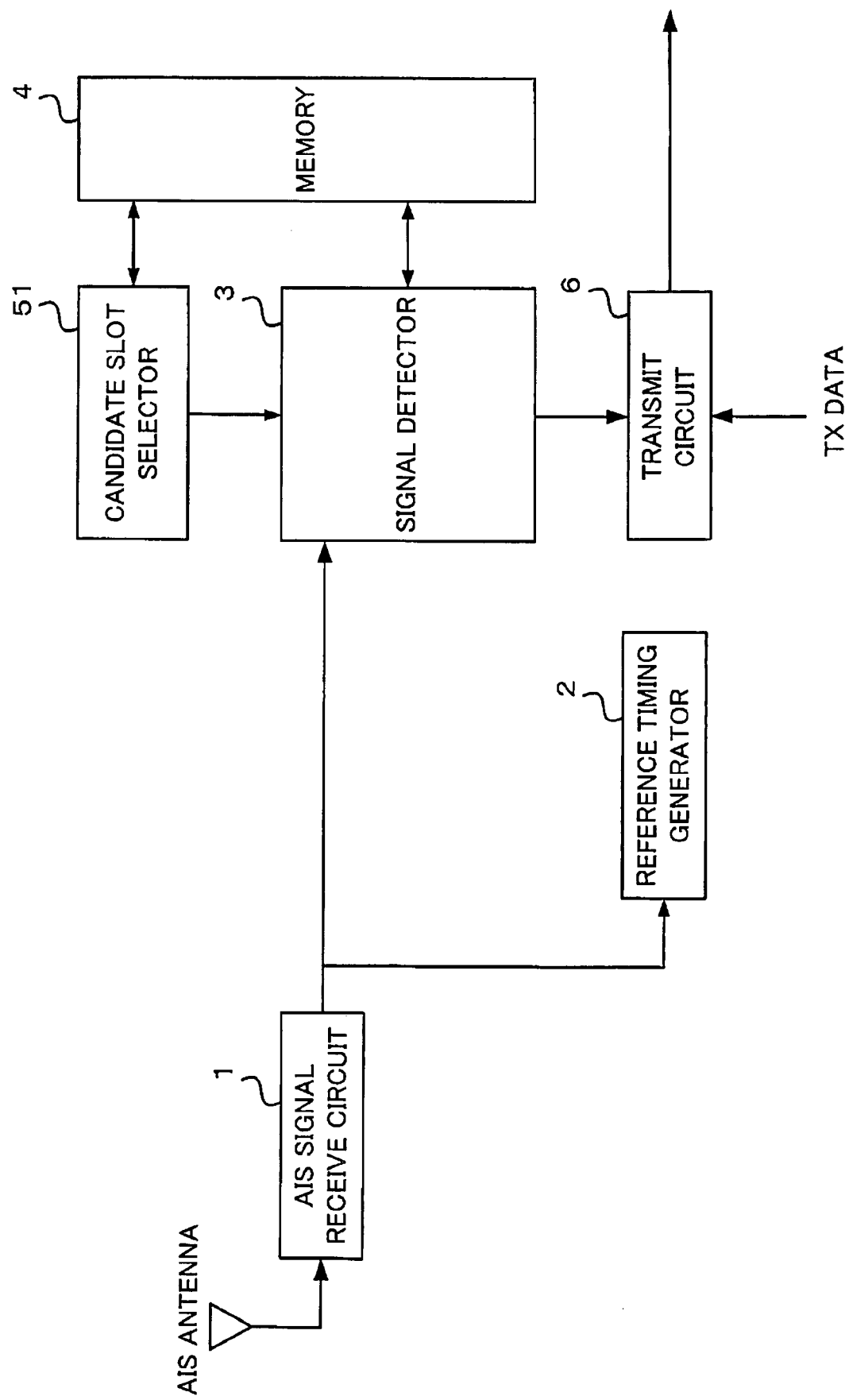
FIG. 5 is a block diagram showing a configuration of a navigational aid according to a second embodiment of the invention.

FIG. 5 is a block diagram showing a configuration of a navigational aid according to a second embodiment of the invention, in which elements like those of the first embodiment are designated by like reference numerals. As shown in FIG. 5, the navigational aid (Class B AIS apparatus) includes an AIS signal receive circuit 1, a reference timing generator 2, a signal detector 3, a memory 4, a candidate slot selector 51 and a transmit circuit 6.

While the AIS apparatus of the second embodiment performs all the functionality of the aforementioned AIS apparatus of the first embodiment, the AIS apparatus of the second embodiment is characterized in that the candidate slot selector 51 chooses candidate slots based on a state of previous use of time slots.

Like the candidate slot selector 5 of the first embodiment, the candidate slot selector 51 nominates 10 time slots. These 10 time slots are referred to as "candidate slots" from which the AIS apparatus potentially selects one for actual transmission. In this embodiment, the time slots nominated as the candidate slots by the candidate slot selector 51 are chosen based on information on the state of previous use of the individual time slots stored in the memory 4. While various methods of selecting the candidate slots would be available, the AIS apparatus of the present embodiment selects the candidate slots immediately before making a judgment on the presence or absence of a signal in a current time slot as will be discussed in the following.

Figure 6:
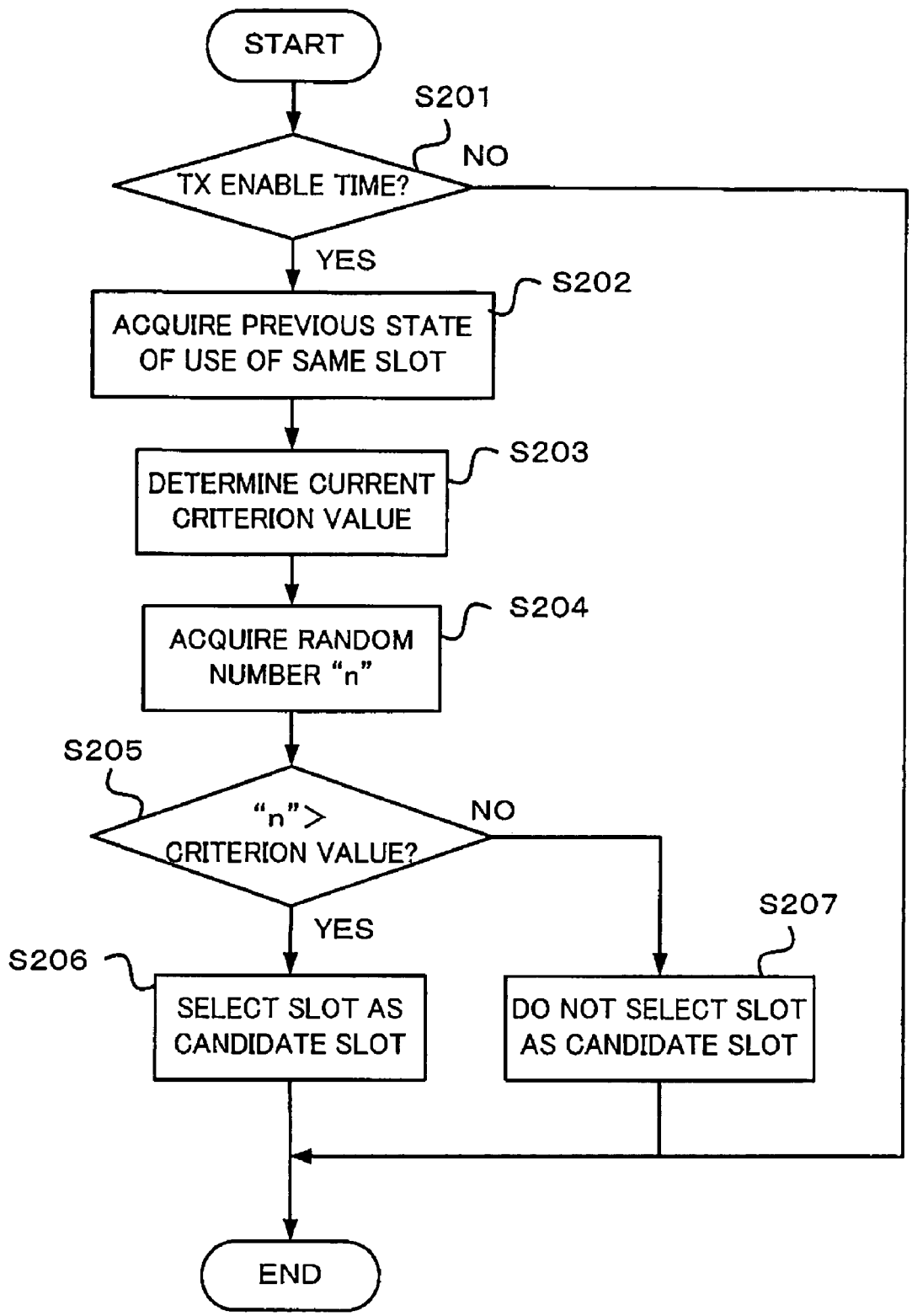
FIG. 6 is a flowchart showing how a candidate slot selector selects candidate slots in the navigational aid according to the second embodiment of the invention.
Figure 7:
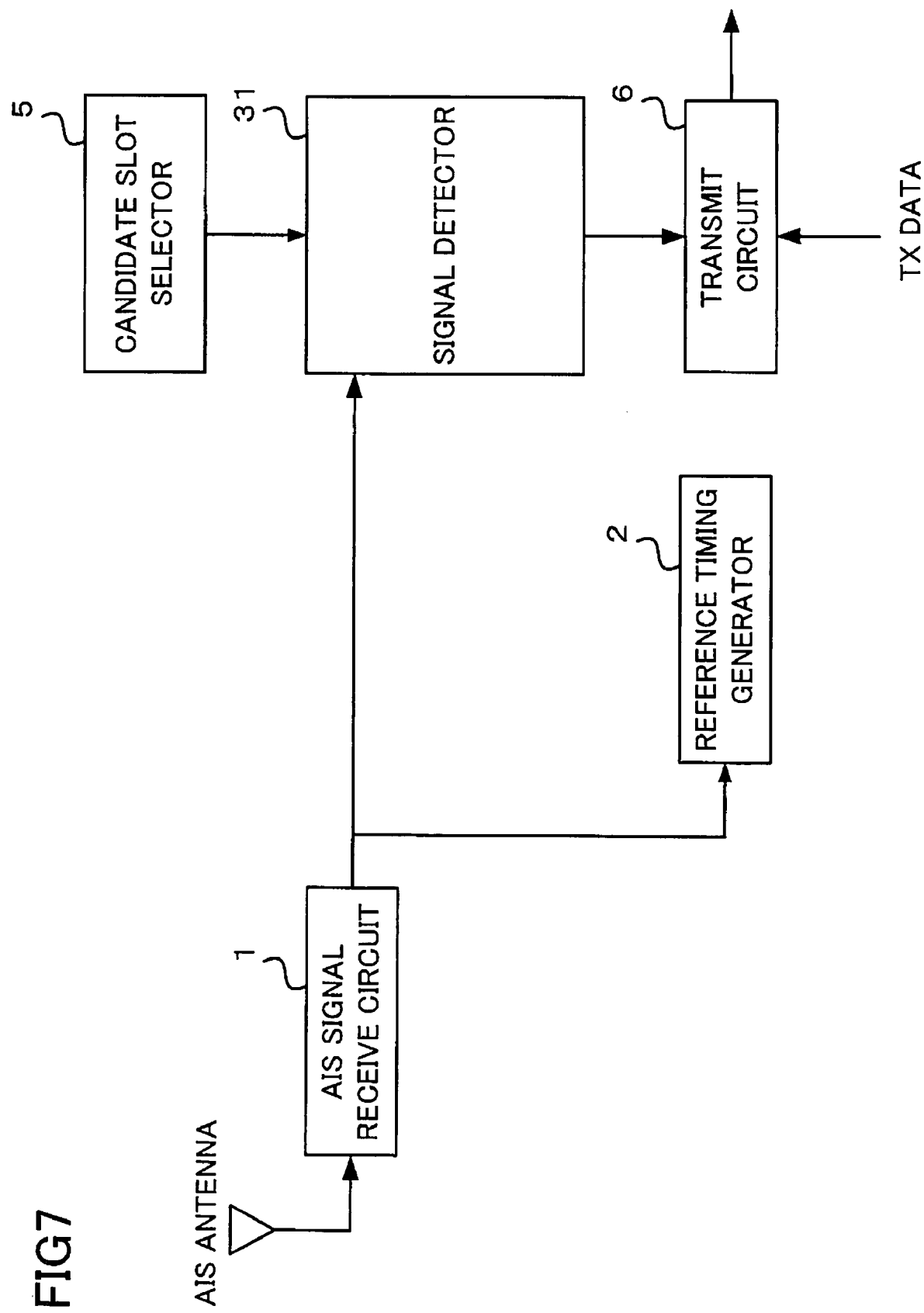
FIG. 7 is a block diagram showing a configuration of a navigational aid according to a third embodiment of the invention.

FIG. 6 is a flowchart of a procedure of candidate slot selection operation showing how the candidate slot selector 51 selects the candidate slots.

First, the candidate slot selector 51 judges whether a current time slot is in a transmission enable time, or a selection interval SI, determined by a predefined reporting rate (step S201). If the current time slot is in the selection interval SI, the candidate slot selector 51 proceeds to step S202, and if the current time slot is not in the selection interval SI, the candidate slot selector 51 terminates the candidate slot selection operation.

In a case where the current time slot is in the selection interval SI (Yes in step S201), the signal detector 3 acquires a state of previous use of the same time slot from the memory 4 (step S202). Based on the acquired state of previous use of the current time slot, the candidate slot selector 51 determines a current criterion value which will be used in candidate slot selection (step S203). Then, the candidate slot selector 51 acquires a random number n (step S204) and compares the random number n with the criterion value determined in step S203 (step S205).

In this embodiment, the criterion value and a range of the random number n are determined as follows. If the selection interval SI contains 100 time slots, for example, the criterion value and the range of the random number n are set such that a candidate slot is selected with a probability of 1/10. Specifically, if the random number n takes a value selected from a range of 1 to 1000, for example, the criterion value is set to 900 in principle. A characteristic feature of the present embodiment is that the criterion value for each time slot is increased or decreased in accordance with the state of previous use of the current time slot. This makes it possible to give high priority to a time slot having a high possibility of being free of an information signal transmitted from a Class A station in selecting a candidate slot. The criterion value should be increased as the possibility of the existence of an information signal increases, decreased as the possibility of the existence of an information signal decreases, in consideration of the state of previous use of the current time slot. At the same time, the criterion value should be set such that a product of the number of slots within the selection interval SI times an average of criterion values within SI becomes approximately equal to one-tenth the range of the random number n.

If the random number n is judged to be larger than the criterion value in step S205, the candidate slot selector 51 selects the current time slot as a candidate slot (step S206), and if the random number n is judged to be equal to or smaller than the criterion value, the candidate slot selector 51 does not select the current time slot as a candidate slot (step S207).

The navigational aid (Class B AIS apparatus) of the second embodiment is so configured as to select a candidate slot based on the information on the state of previous use of the current time slot as discussed above. This configuration makes it possible to select time slots having a high possibility of being free of an information signal transmitted from a Class A station as candidate slots so that the Class B (CS) station can transmit own information signal with proper timing while avoiding conflicts with transmissions from the Class A stations.

Third Embodiment

FIG. 6 is a block diagram showing a configuration of a navigational aid according to a third embodiment of the invention, in which elements like those of the first embodiment are designated by like reference numerals. As shown in FIG. 6, the navigational aid (Class B AIS apparatus) includes an AIS signal receive circuit 1, a reference timing generator 2, a signal detector 31, a candidate slot selector 5 and a transmit circuit 6.

What is characteristic of the AIS apparatus of the third embodiment is that the signal detector 31 makes a judgment on the presence or absence of an information signal by performing pattern recognition of a baseband signal, and not by evaluating the signal intensity level as in the aforementioned AIS apparatus of the first embodiment.

The signal detector 31 performs pattern recognition operation to determine whether a baseband signal obtained by demodulating a signal received by the AIS signal receive circuit 1 is an information signal. Specifically, the signal detector 31 monitors behavior of the baseband signal as plotted on an IQ-plane and makes a judgment to determine whether the received signal is an information signal based on the result of monitoring.

FIGS. 8A and 8B are diagrams showing the behavior of the baseband signal on the IQ-plane, FIG. 8A depicting an example of the behavior of the baseband signal modulated by Gaussian minimum shift keying (GMSK) on the IQ-plane and FIG. 8B depicting an example of the behavior of noise on the IQ-plane.

If the baseband signal of the true phase-modulated signal received by the AIS signal receive circuit 1 and the noise are plotted on the IQ-plane to represent I- and Q-components of the baseband signal and the noise, plots of the baseband signal move along a specific regular pattern as shown in FIG. 8A, whereas plots of the noise having a random nature move along an irregular pattern as shown in FIG. 8B, for example.

Thus, the signal detector 31 of the AIS apparatus of the present embodiment monitors the behavior of received signals plotted on the IQ-plane while carrying out the pattern recognition operation to determine whether any information signal exists in each time slot. The pattern recognition operation allows a relatively wide variety of choice of techniques to use, such as a support vector machine, subspace method and neural network, not to mention a combination thereof.

1) Support Vector Machine

Figure 9:
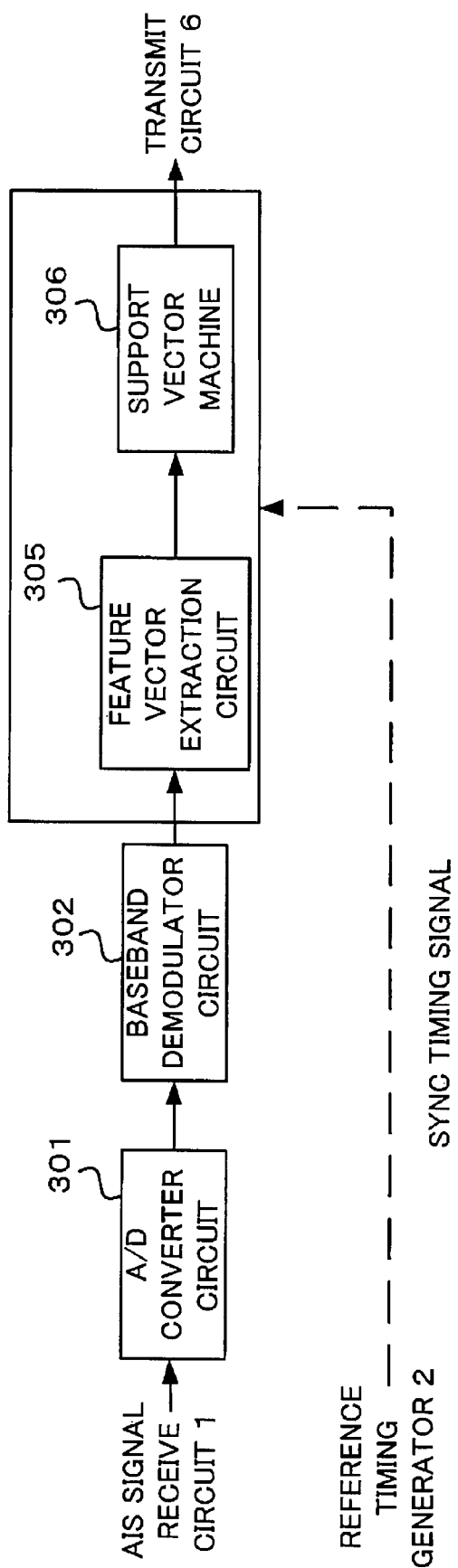
FIG. 9 is a block diagram showing a configuration of a signal detector of the navigational aid according to the third embodiment.

FIG. 9 is a block diagram showing an exemplary detailed configuration of the signal detector 31 of the AIS apparatus according to the third embodiment of the invention, in which elements like those of the signal detector 3 of the first embodiment (FIG. 2) are designated by like reference numerals.

Referring to FIG. 9, the signal detector 31 includes an analog-to-digital (A/D) converter circuit 301, a baseband demodulator circuit 302, a feature vector extraction circuit 305 and a support vector machine 306.

The feature vector extraction circuit 305 extracts feature vectors based on a baseband signals output from the baseband demodulator circuit 302. An example of a feature vector is a vector having as an element a frequency spectrum component which is obtained by fast Fourier transform (FFT), signal intensity, phase information, time derivative of phase information (speed component of the signal) or second derivative (acceleration component of the signal), for instance.

The support vector machine 306 judges whether any information signal exists in a current time slot using a feature vector extracted by the feature vector extraction circuit 305 in that time slot. The support vector machine 306 makes this judgment based on the result of calculation conducted by using a Kernel function. Specifically, the support vector machine 306 determines whether an information signal exists in a given time slot by detecting the sign (plus or minus) of the value of equation (1) below:

$$w^T \Phi(x) + b = \sum_i \alpha_i y_i K(x_i, x) + b \qquad (1)$$

where $w^T$ is the transpose of a weight vector, $\Phi(x)$ is a vector in a high-order space, b is a bias, $\alpha_i$ is a constant, $y_i$ is the result of judgment on a support vector $x_i$ and $K(x_i, x)$ is the Kernel function which may be a polynomial Kernel or a Gaussian Kernel. Since the use of the Kernel function eliminates the need to know any details of a space obtained by transformation or the variable $\Phi(x)$, it is possible to determine the presence or absence of an information signal in a given time slot by way of calculation.

2) Subspace Method

The subspace method, which may be used in the pattern recognition operation, is a technique of discriminating true signals from noise by a process of selecting a subspace from an eigenspace based on an information signal learning result and extracting a feature quantity of a signal to be judged by projecting the signal into the selected subspace.

Figure 10:
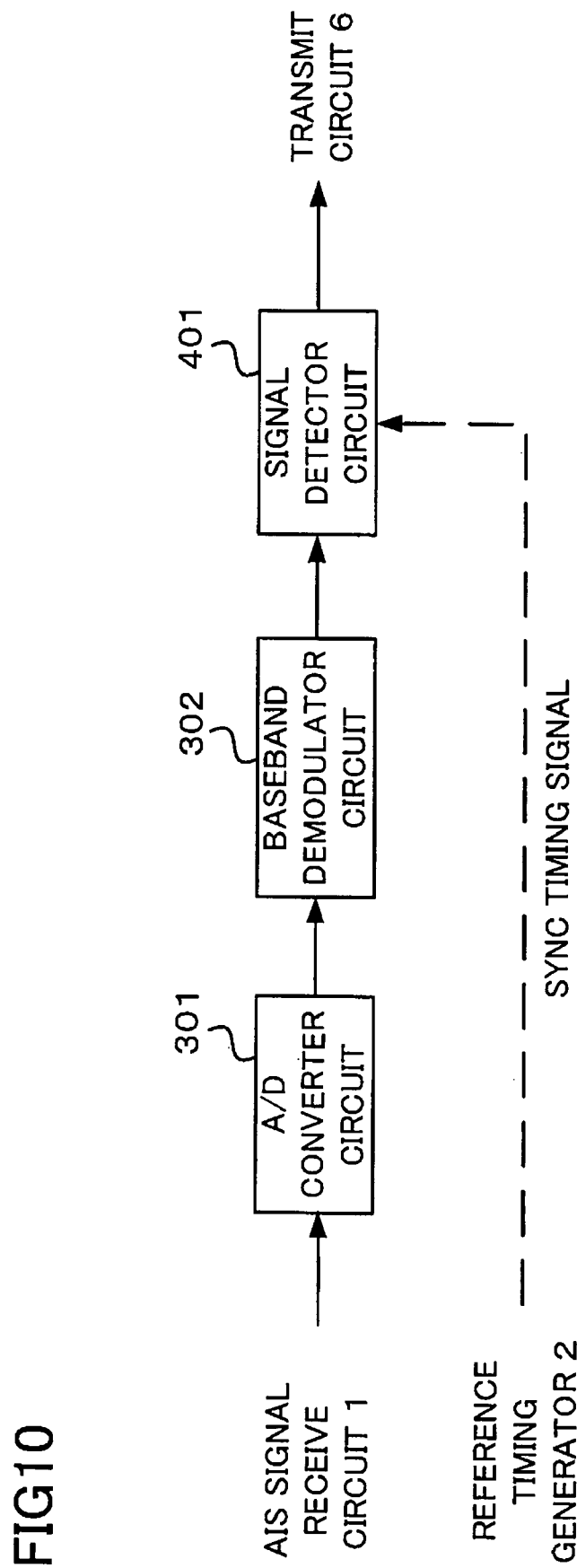
FIG. 10 is a block diagram showing a configuration of another signal detector of the navigational aid according to the third embodiment.

FIG. 10 is a block diagram showing another exemplary detailed configuration of the signal detector 31 of the AIS apparatus according to the third embodiment of the invention, in which elements like those of the signal detector 3 of the first embodiment (FIG. 2) are designated by like reference numerals.

Referring to FIG. 10, the signal detector 31 includes an analog-to-digital (A/D) converter circuit 301, a baseband demodulator circuit 302 and a signal detector circuit 401.

The signal detector circuit 401 carries out the pattern recognition operation by using the subspace method to monitor the behavior of the baseband signal on the IQ-plane.

Specifically, the signal detector circuit 401 judges whether any information signal exists in a current time slot by the subspace method in the following fashion. First, the signal detector circuit 401 selects an eigenspace upon learning multiple sample data which may be judged as a information signal and generates a subspace (partial eigenspace) in advance according to the cumulative contribution ratio of the selected eigenspace. Each AIS apparatus goes through this learning process and the learning result is written in a memory of the signal detector circuit 401, for example, before shipment from a factory.

When a baseband signal is entered, the signal detector circuit 401 projects the input baseband signal into the subspace generated to extract a feature quantity of the baseband signal. Then, the signal detector circuit 401 judges whether the input signal is an information signal or not by comparing the extracted feature quantity against a feature quantity normally expected to be possessed by learning data. For example, the signal detector circuit 401 makes this judgment based on whether the Euclidean distance between both feature quantities exceeds a predefined threshold value or not. The subspace method enables the signal detector circuit 401 to judge whether an information signal is present in a given time slot in the aforementioned manner.

3) Neural Network

The behavior of the baseband signal can also be observed by pattern recognition performed by using a neural network.

Various types of neural networks can be used for accomplishing the neural network approach. These include hierarchical neural networks, such as Perceptron, back-propagation (BP) learning, Neocognitron, as well as interconnection networks, such as Associatron, Hopfield Network and Boltzmann machine.

As discussed in the foregoing, the navigational aid (Class B AIS apparatus) of the third embodiment can determine whether an information signal is present in a particular time slot by monitoring the behavior of the baseband signal plotted on the IQ-plane through the pattern recognition operation performed by using a support vector machine, subspace method or neural network, as appropriate. This makes it possible to perform the carrier sense operation and judge on the presence of a modulated signal by using a pattern recognition technique, and not by simply evaluating the received signal intensity level.

While the foregoing discussion of the third embodiment of the invention has dealt with an example in which the navigational aid (Class B AIS apparatus) is not provided with the memory 4, the navigational aid may be so modified as to include the memory 4 for storing information about previous use of individual time slots obtained by the signal detector 31 as in the navigational aid of the first embodiment so that the stored information is used for judgment on the presence or absence of an information signal in each time slot.

When the support vector machine is used, for example, the information stored in the memory 4 is not limited to such information that indicates whether an information signal was present in each time slot but may be any information which can be used for judging the state of previous use of the individual time slots, such as the absolute value of $(w^T\Phi(x)+b)$ representing the distance from a judgment criterion (which is a value indicating the possibility of previous presence of an information signal) or the absolute value of the feature vector $(w^T\Phi(x)+b)$ of the signal intensity, for instance. Also, one method of using the information stored in the memory 4 would be to calculate the probability of the presence of an information signal in a given time slot taking into consideration the state of previous use of the time slot and, then, increase or decrease the bias b of equation (1) according to the probability calculated. It is possible to monitor the behavior of the received signal plotted on the IQ-plane with enhanced accuracy of the judgment result by judging the presence or absence of an information signal in the time slot using the information about the state of previous use of the time slot as mentioned above. Needless to say, the above-described technique is similarly applicable even when the subspace method or neural network is used.

Fourth Embodiment

Figure 11:
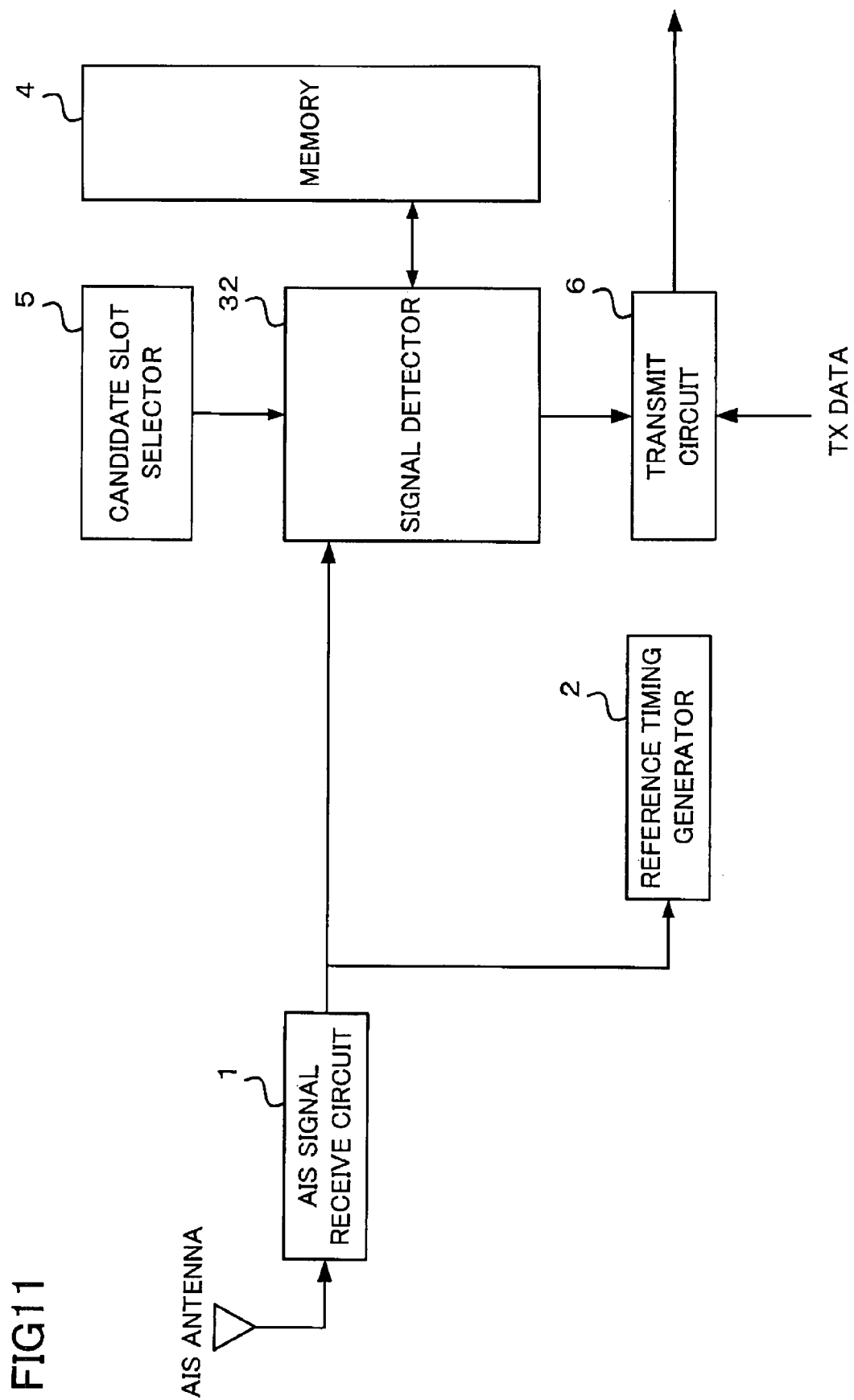
FIG. 11 is a block diagram showing a configuration of a navigational aid according to a fourth embodiment of the invention.

FIG. 11 is a block diagram showing a configuration of a navigational aid according to a fourth embodiment of the invention, in which elements like those of the first embodiment are designated by like reference numerals. As shown in FIG. 11, the navigational aid (Class B AIS apparatus) includes an AIS signal receive circuit 1, a reference timing generator 2, a signal detector 32, a memory 4, a candidate slot selector 5 and a transmit circuit 6.

What is characteristic of the AIS apparatus of the fourth embodiment is that the signal detector 32 makes a judgment on the presence or absence of an information signal based on both the received signal intensity level and the behavior of the baseband signal plotted on the IQ-plane.

Figure 12:
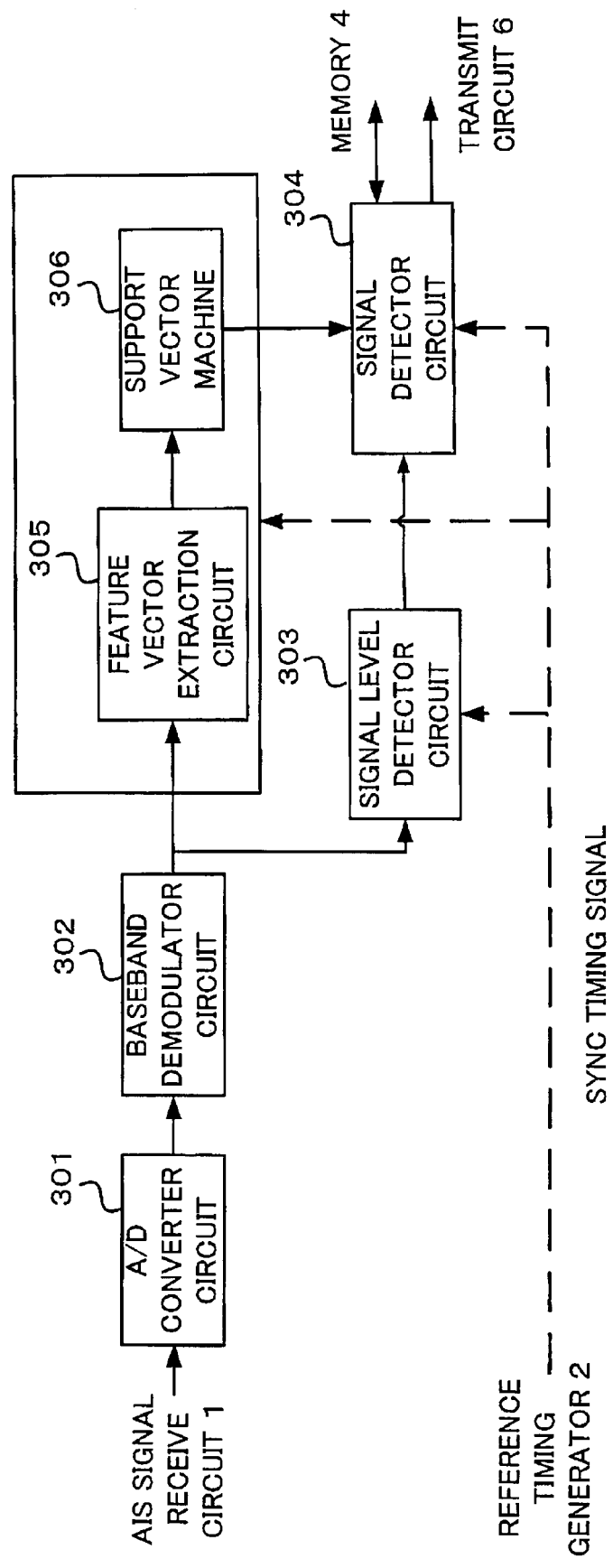
FIG. 12 is a block diagram showing a configuration of a signal detector of the navigational aid according to the fourth embodiment.

As shown in a block diagram of FIG. 12, the signal detector 32 of the fourth embodiment is structured as if the signal detector 3 of the first embodiment (FIG. 2) is combined with the signal detector 31 (including the support vector machine 306) of the third embodiment (FIG. 9) are combined. The signal detector 32 of this embodiment determines whether any information signal exists in each time slot taking into consideration both the received signal intensity level and the behavior of the baseband signal plotted on the IQ-plane. Needless to say, it is possible to monitor the behavior of the baseband signal plotted on the IQ-plane by using a support vector machine or one of various pattern recognition operation techniques, such as the subspace method or neural network.

With this arrangement of the fourth embodiment, the presence of an information signal can expectedly be determined more accurately, so that a Class B (CS) station can transmit its own information with proper timing while avoiding conflicts with transmissions from Class A AIS stations.

While the foregoing discussion of the first to fourth embodiments has described the navigational aids in which the reference timing generator 2 generates the synchronization timing signal using a signal received from a Class A AIS station, the navigational aid of the invention may of course have a configuration as shown in FIG. 13. Specifically, one possible configuration of the navigational aid (Class B AIS apparatus) of the invention is such that the Class B AIS apparatus is provided with its own GNSS receiver (e.g., a GPS receiver) in which a position fix calculator 12 acquires a precise time signal from a signal received by a positioning signal receiver 11 and a reference timing generator 13 generates a synchronization timing signal based on the time signal obtained from the position fix calculator 12.

It is to be understood that the foregoing embodiments of the invention are simply illustrative of preferred forms of implementation thereof. Accordingly, the invention is not limited to the foregoing embodiments but is intended to embrace various alternatives, modifications and variations of the embodiments without departing from the scope and spirit of the invention as will be apparent to those skilled in the art.

What is claimed is:

1. A navigational aid for use as an AIS apparatus, said navigational aid comprising:
- a receiver for receiving signals transmitted from other stations;
- a reference timing generator for generating a synchronization timing signal used for controlling timing of communication with the other stations;
- a memory for storing information about previous use of each time slot specified in accordance with the synchronization timing signal;
- a signal detector for judging whether an information signal exists in a time slot specified in accordance with the synchronization timing signal by using the signal received by said receiver and the information stored in said memory; and
- a transmitter for transmitting information about own station in a time slot which has been judged by said signal detector to be free of an information signal transmitted from any of the other stations; wherein
- the signal detector sets a threshold, for judging whether an information signal exists in the specified time slot, based on a probability of a presence of an information signal during previous use of the specified time slot.

2. The navigational aid according to claim 1, wherein said transmitter transmits information about own station in a time slot which has been judged by said signal detector within a specific time duration at the start of the time slot to be free of an information signal transmitted from any of the other stations.

3. The navigational aid according to claim 2, wherein said signal detector judges whether an information signal exists in a time slot specified in accordance with the synchronization timing signal by using a measurement value of signal intensity of the signal received by said receiver and the information stored in said memory.

4. The navigational aid according to claim 3 further comprising a candidate slot selector for selecting candidate slots based on the information stored in said memory, the candidate slots being a set of time slots from which the time slot used for transmitting the information about own station is selected.

5. The navigational aid according to claim 3 further comprising:
- a positioning signal receiver for receiving a positioning signal transmitted from a satellite; and
- a position fix calculator for performing position fixing operation using the positioning signal and acquiring a precise time signal;
- wherein said reference timing generator generates the synchronization timing signal based on the time signal obtained from said position fix calculator.

6. The navigational aid according to claim 2, wherein said signal detector performs pattern recognition operation to determine whether a baseband signal obtained by demodulating the signal output from said receiver is an information signal and then judging whether an information signal exists in a time slot specified in accordance with the synchronization timing signal by using a result of the pattern recognition operation and the information stored in said memory.

7. The navigational aid according to claim 6, wherein said signal detector performs the pattern recognition operation by using at least one technique selected from among a support vector machine, subspace method and neural network.

8. The navigational aid according to claim 6 further comprising a candidate slot selector for selecting candidate slots based on the information stored in said memory, the candidate slots being a set of time slots from which the time slot used for transmitting the information about own station is selected.

9. The navigational aid according to claim 3 wherein said signal detector verifies whether an information signal exists in the time slot specified in accordance with the synchronization timing signal throughout the entire time slot when said transmitter does not transmit the information about own station in the pertinent time slot, and said memory stores information about a result of verification by said signal detector as the information about previous use of the time slot.

10. The navigational aid according to claim 6 wherein said signal detector verifies whether an information signal exists in the time slot specified in accordance with the synchronization timing signal throughout the entire time slot when said transmitter does not transmit the information about own station in the pertinent time slot, and said memory stores information about a result of verification by said signal detector as the information about previous use of the time slot.

11. The navigational aid according to claim 2 further comprising a candidate slot selector for selecting candidate slots based on the information stored in said memory, the candidate slots being a set of time slots from which the time slot used for transmitting the information about own station is selected.

12. The navigational aid according to claim 2 wherein said signal detector verifies whether an information signal exists in the time slot specified in accordance with the synchronization timing signal throughout the entire time slot when said transmitter does not trans the information about own station in the pertinent time slot, and said memory stores information about a result of verification by said signal detector as the information about previous use of the time slot.

13. The navigational aid according to claim 2 further comprising:
- a positioning signal receiver for receiving a positioning signal transmitted from a satellite; and
- a position fix calculator for performing position fixing operation using the positioning signal and acquiring a precise time signal;
- wherein said reference timing generator generates the synchronization timing signal based on the time signal obtained from said position fix calculator.

14. The navigational aid according to claim 1 further comprising a candidate slot selector for selecting candidate slots based on the information stored in said memory, the candidate slots being a set of time slots from which the time slot used for transmitting the information about own station is selected.

15. The navigational aid according to claim 1 further comprising:
- a positioning signal receiver for receiving a positioning signal transmitted from a satellite; and
- a position fix calculator for performing position fixing operation using the positioning signal and acquiring a precise time signal;
- wherein said reference timing generator generates the synchronization timing signal based on the time signal obtained from said position fix calculator.

* * * * *